United States Patent

Linke et al.

[11] Patent Number: 6,046,830
[45] Date of Patent: Apr. 4, 2000

[54] DYNAMIC REFRESH FOR OPTICAL DATA STORAGE

[75] Inventors: Richard A. Linke, Lawrenceville; Warren D. Smith, Plainsboro, both of N.J.

[73] Assignee: NEC Research Institute, Inc., Princeton, N.J.

[21] Appl. No.: 09/162,556

[22] Filed: Sep. 29, 1998

[51] Int. Cl.[7] .............................. G03H 1/02; G03H 1/30; G03H 1/20; G03H 1/04
[52] U.S. Cl. .................................. 359/7; 359/4; 359/25; 359/12; 430/1; 430/2
[58] Field of Search .................................. 359/3, 4, 7, 25, 359/21, 10, 12; 430/1, 2

[56] References Cited

U.S. PATENT DOCUMENTS

| | | | |
|---|---|---|---|
| 5,422,873 | 6/1995 | Kewitsch et al. | 369/103 |
| 5,877,873 | 3/1999 | Bashaw et al. | 359/10 |
| 5,920,409 | 7/1999 | Chadi et al. | 359/15 |

OTHER PUBLICATIONS

P.J. van Heerden, "Theory of Optical Information Storage in Solids", Applied Optics, vol. 2, No. 4, Apr. 1963, pp. 393–400.

*Primary Examiner*—Cassandra Spyrou
*Assistant Examiner*—Fayez Assaf
*Attorney, Agent, or Firm*—Scully, Scott, Murphy & Presser

[57] ABSTRACT

A method for dynamically refreshing a holographic data storage medium wherein data is stored in a plurality of data pages, each of which comprises a two dimensional pattern of pixel data. Each data page is stored by interfacing an image or a Fourier transform of the data page with a reference beam to form a holographic recording of the data page in the holographic medium. Pursuant to the method, all of the data pages are classified as either good pages, each of which was written into storage less than a threshold time ago related to the decay of the holographic recording, or empty pages available for writing, or self-erasing pages which are self-erasing with time. At sequential time intervals, the oldest good page is read which then becomes a self-erasing page, and its data is rewritten into an empty page which then becomes the youngest good page, and the oldest self-erasing page becomes an empty page.

5 Claims, 1 Drawing Sheet

DYNAMIC REFRESH FOR OPTICAL DATA STORAGE

BACKGROUND OF THE INVENTION

1. Field of the Invention

The present invention relates generally to a dynamic refresh operation for optical data storage, and more particularly pertains to a method for dynamically refreshing a holographic data storage medium. The data storage medium can comprise crystals of $CdF_2$ doped with Ga which can record holograms by the "DX effect", in which optical excitation causes a long term change in the refractive index, on the order of 0.01, to achieve very high volume storage bit densities. The present invention can advantageously be utilized in memory applications where hard disc drives are currently utilized, such as to load software, wherein relatively little writing and erasing operations occur.

2. Discussion of the Prior Art

The present invention relates to the field of holographic data storage. A holographic data storage arrangement enables a very high storage capacity and very high recording and readout rates compared to existing disk-based techniques, and can be used within computer systems as an addition to, or replacement for, conventional magnetic disk or tape or magneto-optic storage systems.

The holographic recording material medium is typically formed of a material such as lithium niobate, or a DX-center material. Typically, the holographic medium in a prior art holographic storage system has the shape of a cube or cuboid, or is cylindrically shaped, and is fixed in position. The optical beam bearing the data image is typically incident from a fixed direction. A single hologram is recorded by allowing an image beam containing a two-dimensional page of data to be incident on the medium simultaneously with a simple write reference bead derived from the same source as the data image beam, but incident at a different angle. The two beams form a stationary optical interference pattern which is recorded by the holographic medium in the form of a refractive index image which follows the interference pattern.

Reconstruction of the data image is achieved by illuminating the holographic medium with a read reference beam identical to the write reference beam, causing Bragg diffraction to reproduce the original data image beam.

Illumination with a read reference beam identical to the write reference beam in every respect except its direction results in negligible reconstruction of the data page. The angular range of the read reference beam around that of the original write reference beam which may be used and still cause readout of only the single desired data page is a function of the physical parameters of the system. This angular proximity is referred to as the angular Bragg width. This angular selectivity allows recording of multiple holograms of data pages by changing the angle of incidence of the write reference beam. Other methods of multiplexing pages are possible, such as by the use of varying wavelengths, or by spatial encoding of non-plane reference beams, but angular multiplexing of a simple plane wave reference beam is the most common approach.

Typically, a laser emits a beam which is collimated by a collimating lens and split by a beamsplitter to form a reference beam and a data beam. The reference beam is redirected by a prism or mirror to fall onto the holographic medium. The data beam is redirected by a prism or mirror to fall upon a page-composing device such as a spatial light modulator (SLM) which imposes a two-dimensional pattern of the data page to be stored onto the amplitude of the beam. This pattern typically consists of a dark region (or "pixel") representing a binary zero bit and a bright pixel representing a one bit.

A lens forms either an image or a Fourier transform of the data page within or near the holographic medium, where it interfaces with the reference beam to form a holographic recording of the data page. The two beams are incident on the holographic medium for some exposure time which is such that the required magnitude of change of refractive index is created. This time depends upon the laser power available and the sensitivity of the holographic medium.

To read out data, the page-composing device is turned off to block all light in its path, and only the reference beam falls on the holographic medium. The data page beam is reproduced by diffraction from the stored hologram, and is imaged (or Fourier-transformed) by a lens to create an image of the original data page which may be recorded by a camera. The electrical signal retrieved from each camera pixel is discriminated to be either a zero or a one, and the original digital data is thus retrieved.

The inherent theoretical capacity of a holographic storage medium in bits is $V/\lambda^3$ (according to a calculation by P. J. Van Heerden, Appl. Opt., 2(4), p. 393, (1963), where V is the volume of the holographic material and $\lambda$ is the wavelength of light inside the holographic material. This leads to very high potential memory capacities and is a major reason for the interest in holographic storage. For example, a 1 inch cube with a refractive index of 1.5 has a theoretical capacity of $4.4 \times 10^{14}$ bits at 500 nm wavelength, or 55 terabytes. In order to approach this value in practice, page sizes should be as large as possible (in the range $10^6$ to $10^8$ bits), and the maximum number of pages should be stored which the medium can support.

Since pages can be written and read out in parallel, data rates are also inherently high, and are typically limited by the speed at which data can be loaded into the page-composing device (during writing) or downloaded from a camera (during readout). For example, a page-size of $4 \times 10^7$ bits need only be read out once every second to be equal to existing magnetic hard disk readout rates of 5 MB/s.

SUMMARY OF THE INVENTION

Accordingly, it is a primary object of the present invention to provide a dynamic refresh operation for optical data storage.

The dynamic refresh operation of the present invention is similar in concept to the "refresh" operations in present-day dynamic RAM chips, and is also similar to techniques used in some older memory technologies, such as mercury delay line memories, and also memories based upon finite fluorescence lifetimes in phosphors in CRT tubes.

Specifically, crystals of $CdF_2$ doped with Ga can record holograms by the "DX effect", in which optical excitation causes a long term change in the refractive index, on the order of 0.01. Potentially, in the absence of scattering and with optical resolution as good as possible, volume bit densities are achievable on the order of 1 bit per lambda$^3$ (lambda=wavelength of light). With 500 nm light in a 1 cc cube this would be $8*10^{12}$ bits, i.e. 1 terabyte, which is 100 times greater than a present day 10 gigabyte disc, assuming these densities can be achieved.

Also the readout and writing bit rates are much faster than for a disc, due to optical parallelism (an entire hologram is read at once) although the seek latencies are similar.

A first problem is that the recorded refractive index change decays with time, and the decay is faster at higher temperatures.

A second problem is that as more bits are written, a "bias buildup" occurs in which the average refractive index of the crystal changes, causing older holograms to be more difficult to read out.

A third problem is that individual pages which are written into memory cannot be individually erased, and must be allowed sufficient time to decay or self-erase to a point that the page can be rewritten into with new data.

These problems are eliminated by the dynamic refresh operation of the present invention.

In accordance with the teachings herein, the present invention provides a method for dynamically refreshing a holographic data storage medium wherein data is stored in a plurality of data pages, each of which comprises a two dimensional pattern of pixel data. Each data page is stored by interfacing an image or a Fourier transform of the data page with a reference beam to form a holographic recording of the data page in a holographic medium.

Pursuant to the method, all of the data pages are classified as either good pages, each of which was written into storage less than a threshold time ago related to the decay of the holographic recording, or empty pages available, or free for writing, or self-erasing pages which are self-erasing with time. At sequential time intervals, the oldest good page is read which then becomes a self-erasing page, and its data is rewritten into the oldest empty page which then becomes the youngest good page, and the oldest self-erasing page becomes an empty page.

In one embodiment, the plurality of data pages are positionally arranged in order to form a subsegment of a segment of available storage positions. A good page is read and rewritten one position displaced from a block of good pages, and this operation is repeated in order for all of the good pages to complete a refresh operation, whereby the subsegment of good pages is displaced over by one position for each refresh operation.

In another embodiment, wherein P is the total number of pages, Q is the number of pages in an incremental shift between successive writing operations, g0 is the starting writing position, and * denotes a multiplication operation, then P and Q are selected to be relatively prime numbers, i.e. they have no common integer divisor other than 1, and the good pages are in a set of form, g0, g0+Q*1, g0+Q*2, . . . mod P, and after a refresh operation, g0←g0−Q mod P, thereby displacing by one position.

In a further disclosed embodiment, instead of storing a bit x in position A on page B, instead storing, x XOR pseudorandomfunction (A,B), on readout, XOR again with the pseudorandomfunction (A,B) to retrieve x.

The holographic storage medium can comprise $CdF_2$ doped with Ga which records holograms by the DX effect in which optical excitation causes a semipermanent change in the refractive index of the recording medium.

BRIEF DESCRIPTION OF THE DRAWINGS

The foregoing objects and advantages of the present invention for a dynamic refresh operation for optical data storage may be more readily understood by one skilled in the art with reference being had to the following detailed description of several preferred embodiments thereof, wherein.

DETAILED DESCRIPTION OF THE DRAWINGS

The present invention operates by dividing the memory into a large number P of holographic "pages". Assume for simplicity in the present analysis that the decay of a hologram stored in memory is exponential with time, with a half-time (time for decay by a factor of 2) "$T_{1/2}$." In some embodiments $T_{1/2}$ could be monitored automatically.

Assume that a freshly written hologram has a strength or magnitude of 1, and that a partially decayed hologram has a strength between 0 and 1. Assume also that a hologram of strength $>\frac{2}{3}$ is readable reliably enough, and that a hologram of strength $<\frac{1}{3}$ can be overwritten with new data. Non-exponential decay laws and thresholds other than $\frac{1}{3}$ and $\frac{2}{3}$ are also easily accommodated in different embodiments, although the estimates will change somewhat.

Figure 2:
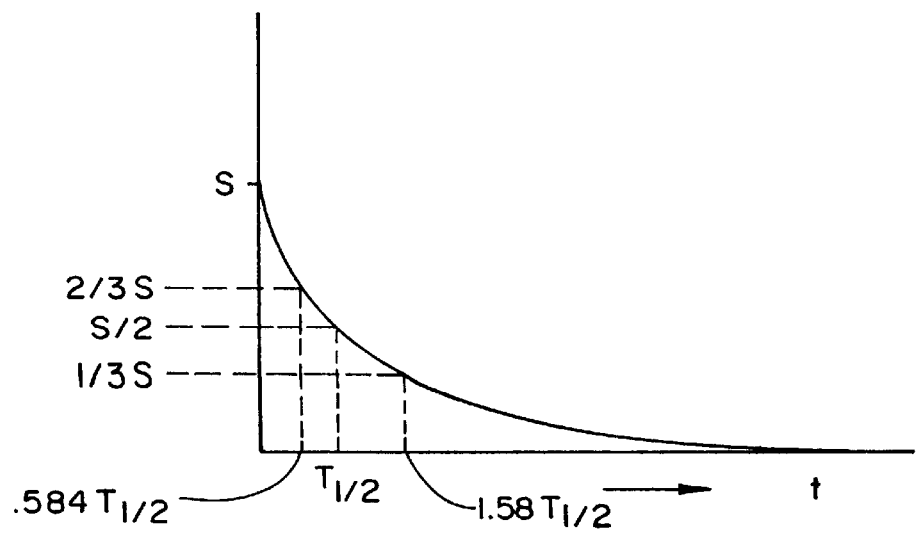
FIG. 2 is a graph of the exponential decay of a hologram stored in memory, and illustrates $T_{1/2}$ and the nature of the exponential decay of the strength S of the stored data signal.

FIG. 2 is a graph of the exponential decay of a hologram stored in memory, and illustrates the nature of the exponential decay of the stored data signal S to $\frac{2}{3}$, $\frac{1}{2}$ and $\frac{1}{3}$.

At any given moment there are 3 kinds of pages.

(1) good pages were written at a time t, $0<t< T_{1/2}*0.5849625$ . . . , ago. ($0.5849625 \ldots =\log(\frac{2}{3})/\log(\frac{1}{2})$).

(2) empty pages, available for writing, were written at a time t, $T_{1/2}*1.58496 \ldots <t$, ago.

(3) the rest of the pages are self-erasing with time, and were written at a time t, $T_{1/2}*0.58496<t<T_{1/2}*1.58496$ . . . , ago.

Assume that the data is to be maintained without destruction. Then designate 36% ($0.36907 \ldots =\log(\frac{2}{3})/\log(\frac{1}{3})$) of the pages as good, just 1 page as empty and available for writing, and the rest are self-erasing with time. At time intervals of $_{0.58496}*T_{1/2}/P$, the oldest good page is read (it then becomes self-erasing with time), and its data is rewritten into an empty page (it then becomes the youngest good page), and the oldest self-erasing with time page becomes an empty page.

Figure 1:
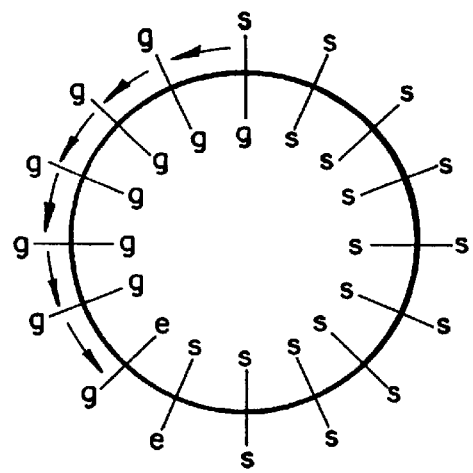
FIG. 1 illustrates memory pages arranged in slots in a circular order, wherein the memory pages are classified as either good (g), self-erasing (s), or empty (e) and available for rewriting.

This may be implemented as follows. Regard the P pages as being arranged in slots in a circular order, as illustrated in FIG. 1, wherein memory pages are arranged in slots in a circular order, and the memory pages are classified as good (g), self-erasing with time (s), or empty (e) and available for writing. The 0.36*P good pages in slots form a subsegment (arc) of the circle, ordered chronologically clockwise. The clockwisemost good page is read and rewritten one spot counterclockwise of the block of good pages, and this is continued in order for all of the good pages to complete a refresh operation. The subsegment of good pages thus becomes shifted over by one slot for each refresh operation.

In a further embodiment wherein P is the total number of pages, Q is the number of pages in an incremental shift between successive writing operations, g0 is the starting writing position, then let P and Q be relatively prime numbers wherein, i.e. they have no common integer divisor other than 1. The concept is to spread the good pages over the storage medium, and make the good pages be a set of form, g0, g0+Q*1, g0+Q*2, . . . mod P and then after refresh, g0←g0−Q mod P "shifting by Q".
The advantage of this is that by selecting Q to be something other than the simplest choice, 1, the system does not require as much angular precision, and also should perform better since the used pages are more uniformly distributed angularly.

Finally, bias buildup can be eliminated in this manner because an essentially CONSTANT fraction of the bits in the memory will be 1's at all times. This is achievable (despite users who may want to write 99% 0's or 99% 1's) by, instead of storing bit x in position A on page B, instead storing x XOR pseudorandomfunction(A,B).

Then, on readout XOR again with a pseudorandomfunction(A,B) to get x back. If the function is sufficiently random, it will be 50% 1's with very high probability. Various well known functions of this type are simple to compute electronically, e.g. so called "shift register sequences".

Note that the effective capacity of the memory will be 36% of the number of pages. Dividing the crystal in half and thermally isolating the two halves would allow accelerated self-erasure of one half at a high temperature, and would yield a system with 50% available capacity. This improvement over the 36% of the single crystal system described above, however, comes at the cost of doubling the optical and mechanical hardware and so is not desirable.

The memory will be maintained as long as the power is on, and even if the power is off for a short period (considerably less than $T_{1/2}$) with a safety margin.

This memory is a "read mostly" memory since if it is written, the writing persists for a long time. However, if the memory is kept at most 50% full (that is, 18%, if 36% is regarded as full), then it appears to the user to be a read-write memory since many empty pages are available to be written in at any time.

The memory of the present invention could be advantageously utilized in memory applications where hard disc drives are currently utilized, such as to load software, wherein relatively little writing and erasing operations occurs.

While several embodiments and variations of the present invention for a dynamic refresh for optical data storage are described in detail herein, it should be apparent that the disclosure and teachings of the present invention will suggest many alternative designs to those skilled in the art.

What is claimed is:

1. A method for dynamically refreshing a holographic data storage medium wherein data is stored in a plurality of data pages, each of which comprises a two dimensional pattern of pixel data which is stored by interfacing an image or a Fourier transform of a data page with a reference beam to form a holographic recording of the data page in a holographic medium, comprising the steps of:

a. classifying each of the plurality of data pages as either reconstructible good pages, each of which reconstructible good data pages was written into storage less than a threshold time ago related to decay of the holographic recording, or empty available for writing, or self-erasing pages;

b. at sequential time intervals, reading the oldest reconstructible good page which then becomes a self-erasing page, and rewriting its data into an empty page which then becomes the youngest reconstructible good page, and the oldest self-erasing page becomes an empty page.

2. A method for dynamically refreshing a holographic data storage as claimed in claim 1, including positionally arranging the plurality of data pages in order to form a subsegment of a segment of available storage positions, and reading and rewriting a reconstructible good page one position displaced from a block of reconstructible good pages, and repeating this operation in order for all of the reconstructible good pages to complete a refresh operation, whereby the subsegment of reconstructible good pages is displaced over by one position for each refresh operation.

3. A method for dynamically refreshing a holographic data storage as claimed in claim 1, further wherein P is the total number of pages, Q is the number of pages in an incremented shift between successive writing operations, and g0 is the starting writing position, then selecting P and Q to be relatively prime numbers, wherein P and Q have no common integer divisor other than 1, arranging the good pages in a set of form, g0, g0+Q*1, g0+Q*2, . . . mod P, and after a refresh operation, g0←g0−Q mod P, thereby displacing by one position.

4. A method for dynamically refreshing a holographic data storage as claimed in claim 1, further wherein instead of storing a bit x in position A on page B, instead storing, x XOR pseudorandomfunction (A,B), on readout, retrieving x by an XOR again with the pseudorandomfunction (A,B).

5. A method for dynamically refreshing a holographic data storage as claimed in claim 1, including forming the holographic storage medium of $CdF_2$ doped with Ga, and recording holograms by the DX effect in which optical excitation causes a semipermanent change in the refractive index of the recording medium.

* * * * *